United States Patent
Kim et al.

(10) Patent No.: US 9,524,253 B2
(45) Date of Patent: Dec. 20, 2016

(54) METHOD OF SELECTING AIR INTERFACE AT AMBIENT CONNECTIVITY AND HUB USING SAID METHOD

(71) Applicant: SAMSUNG ELECTRONICS CO., LTD., Suwon-si (KR)

(72) Inventors: Sang Joon Kim, Hwaseong-si (KR); Ui Kun Kwon, Hwaseong-si (KR); Seungkeun Yoon, Seoul (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 13/936,347

(22) Filed: Jul. 8, 2013

(65) Prior Publication Data

US 2014/0068116 A1   Mar. 6, 2014

(30) Foreign Application Priority Data

Sep. 4, 2012  (KR) .................. 10-2012-0097703

(51) Int. Cl.
| | |
|---|---|
| *G06F 13/00* | (2006.01) |
| *G06F 13/14* | (2006.01) |
| *H04W 52/02* | (2009.01) |
| *G06F 13/28* | (2006.01) |
| *H04L 29/08* | (2006.01) |
| *H04L 29/06* | (2006.01) |
| *H04W 8/00* | (2009.01) |
| *H04W 84/20* | (2009.01) |

(52) U.S. Cl.
CPC .......... *G06F 13/14* (2013.01); *H04W 52/0225* (2013.01); *H04W 52/0251* (2013.01); *G06F 13/28* (2013.01); *H04L 29/06* (2013.01); *H04L 29/08072* (2013.01); *H04W 8/005* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 7,748,636 | B2 * | 7/2010 | Finn | .............................. 235/492 |
| 2005/0064866 | A1 * | 3/2005 | Sun et al. | ................... 455/426.1 |
| 2005/0238047 | A1 | 10/2005 | Holland et al. | |
| 2005/0288003 | A1 * | 12/2005 | Matsumura | ................... 455/418 |
| 2008/0014867 | A1 * | 1/2008 | Finn | .............................. 455/41.1 |
| 2010/0015919 | A1 | 1/2010 | Tian | |
| 2010/0083121 | A1 | 4/2010 | Famolari et al. | |
| 2011/0176469 | A1 * | 7/2011 | Kim et al. | ................... 370/311 |
| 2011/0269414 | A1 | 11/2011 | Falck et al. | |
| 2012/0003933 | A1 * | 1/2012 | Baker | ................ G06F 19/3412 |
| | | | | 455/41.2 |

(Continued)

FOREIGN PATENT DOCUMENTS

KR      10-0959294 B1      5/2010

*Primary Examiner* — Henry Tsai
*Assistant Examiner* — Aurangzeb Hassan
(74) *Attorney, Agent, or Firm* — NSIP Law

(57) ABSTRACT

A method of selecting an interface by a hub, includes searching for a device of the hub, and measuring a distance from the hub to the device based on information of an available interface of the device that is received from the device. The method further includes setting an optimal interface to communicate with the device, based on the distance, and transmitting data to the device through the optimal interface.

23 Claims, 16 Drawing Sheets

(56) References Cited

U.S. PATENT DOCUMENTS

2012/0174237 A1\* 7/2012 Krzyzanowski ............... 726/29
2013/0044051 A1\* 2/2013 Jeong .......................... 345/156
2013/0244578 A1\* 9/2013 Bacioccola ................. 455/41.2

\* cited by examiner

Power consumption

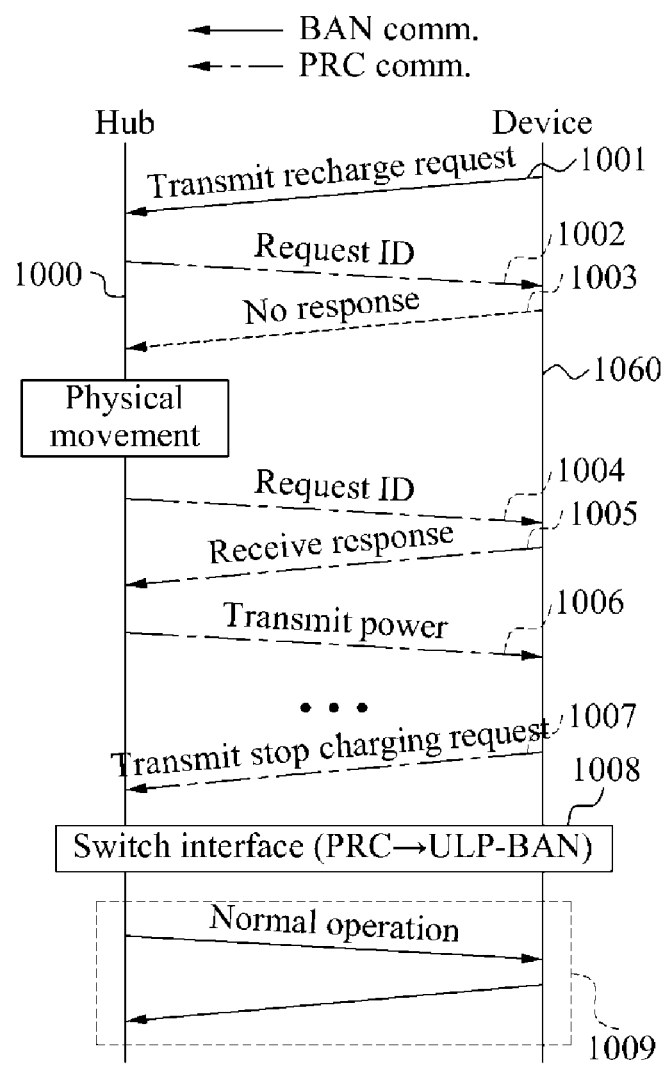

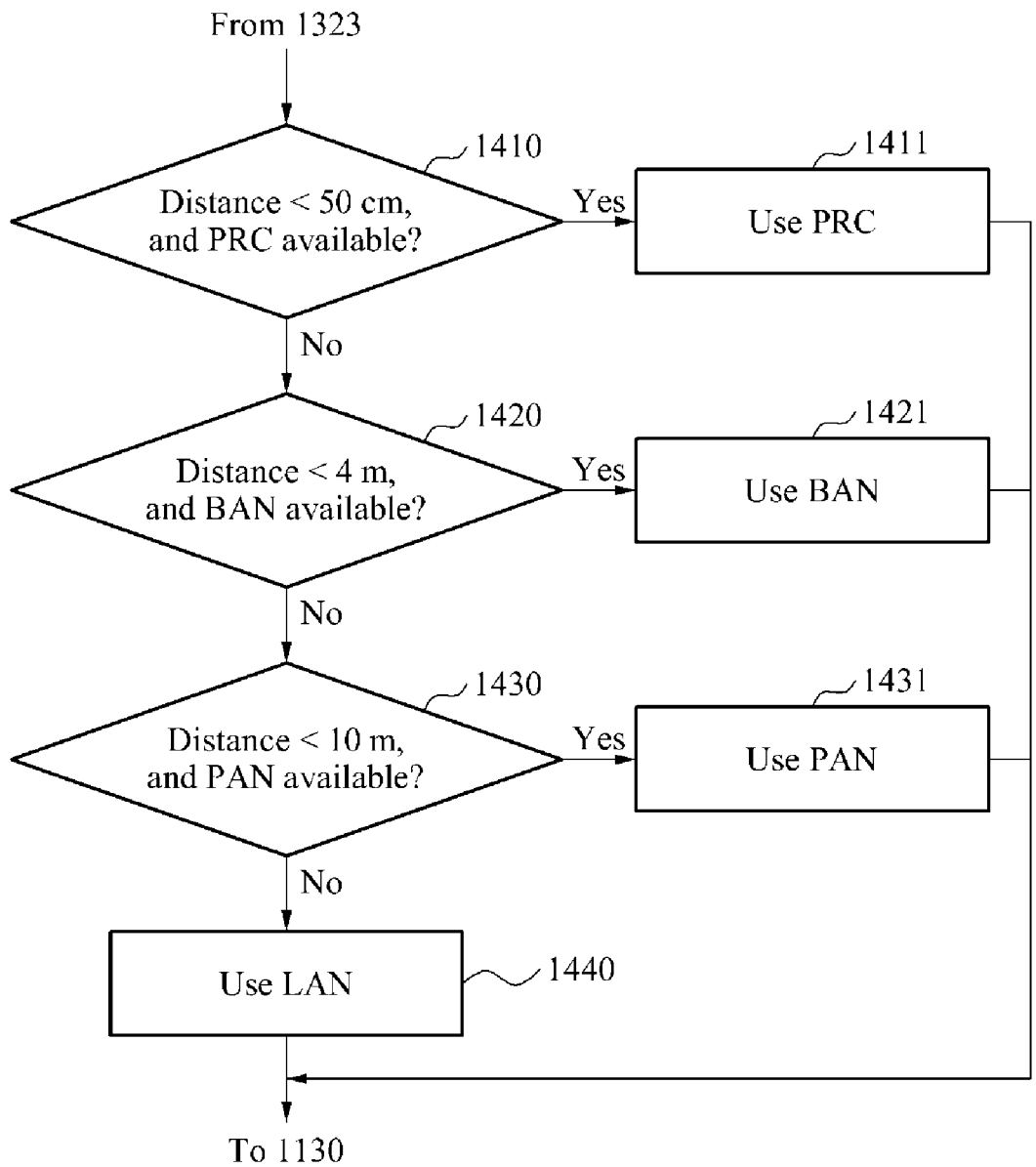

METHOD OF SELECTING AIR INTERFACE AT AMBIENT CONNECTIVITY AND HUB USING SAID METHOD

CROSS-REFERENCE TO RELATED APPLICATION

This application claims the benefit under 35 USC 119(a) of Korean Patent Application No. 10-2012-0097703, filed on Sep. 4, 2012, in the Korean Intellectual Property Office, the entire disclosure of which is incorporated herein by reference for all purposes.

BACKGROUND

1. Field

The following description relates to a method of selecting an air interface at ambient connectivity, and a hub using the method.

2. Description of Related Art

With the spread of handheld devices and smartphones, a need for connectivity between a personal hub based on such a device and an associated peripheral device is increasing. The peripheral device may include, for example, a heathcare device, an environmental sensor, a personal computer (PC), a television (TV), and/or other devices known to one of ordinary skill in the art, which are disposed around a user.

For example, in order to monitor a health condition (e.g., a heart rate) of an individual in real-time by attaching a healthcare sensor (e.g., an electrocardiogram (ECG) patch) to a body and wirelessly transmitting corresponding data to a smartphone, a connectivity between the smartphone and the healthcare sensor may be needed. Accordingly, there is a desire for a method of efficiently obtaining a communication channel between ambient devices of a user and a personal hub, depending on various communication solutions.

SUMMARY

In one general aspect, there is provided a method of selecting an interface by a hub, the method including searching for a device of the hub, and setting an optimal interface to communicate with the device. The method further includes transmitting data to the device through the optimal interface.

In another general aspect, there is provided a method of selecting an interface, the method including searching for a device of a hub, and requesting, from the device, information of an available interface of the device. The method further includes receiving, from the device, the information, and measuring a distance from the hub to the device based on the information. The method further includes setting an optimal interface based on the distance, and transmitting data to the device through the optimal interface.

In still another general aspect, there is provided a hub that selects an interface, the hub including the interface, and a controller configured to search for a device of the hub, set the interface optimized to communicate with the device, and transmit data to the device through the optimized interface.

Other features and aspects will be apparent from the following detailed description, the drawings, and the claims.

BRIEF DESCRIPTION OF THE DRAWINGS

FIG. 10A is a flowchart illustrating an example of a method of a wireless power recharging through a PRC interface.

FIG. 14 is a flowchart illustrating another example of a method of setting an optimal air interface.

DETAILED DESCRIPTION

Figure 1:
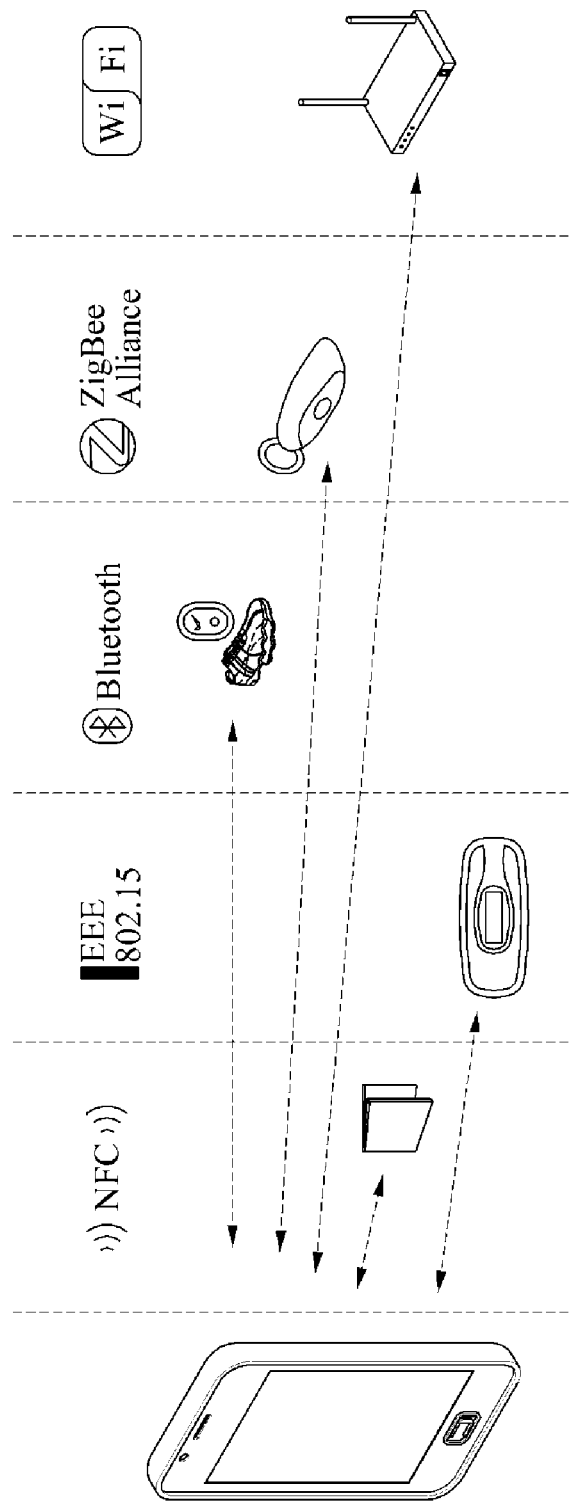
FIG. 1 is a diagram illustrating an example of a personal hub system using various air interfaces.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Prior to the detailed description, terms used herein will be described briefly. The term "air interface" refers to wireless connection conditions, for example, a frequency between a hub, including a smartphone, and an ambient device, a communication scheme, and/or a connection method, and may be referred to as a communication solution. The term "ambient network" refers to a network based on an intelligent communication connection between a personal hub, including a smartphone and/or a handheld device, and a sensor or a peripheral device. Since various communication services may be requested for each application, various air interfaces including different performances may be used, as shown in the following example of Table 1:

| Interface | Power Consumption | Data rate | Communication Range | Connectivity |
|---|---|---|---|---|
| PRC | negative | low | <50 cm | auto |
| ULP-BAN | very low | moderate | <4 m | manual |
| PAN | moderate | moderate | <10 m | manual |
| LAN | high | high | <100 m | manual |

Table 1 shows a result of comparing performances of four types of air interfaces, that is, four different communication solutions. The air interfaces include a proximate resonance connectivity (PRC) interface, an ultra low power body area network (ULP-BAN) interface, a personal area network (PAN) interface, and a local area network (LAN) interface.

When devices are located extremely proximate to each other, for example, when a distance between the devices is less than or equal to 50 centimeters (cm), the PRC interface may be available using a proximate magnetic field channel to enable an intelligent communication between the devices. Since the PRC interface may transmit data and energy, using a proximate magnetic field, a power consumption of the PRC interface for a communication may be a negative value. Accordingly, the PRC interface may transfer energy while communicating. A data rate of the PRC interface may be about hundreds of kilobits per second (kbps), which is relatively low when compared to the other communication solutions. However, the data rate of the PRC interface may be sufficient to transmit data to be used for control in a relatively proximate distance between devices.

The PRC interface may be connected through a peer-to-peer auto connection, which is available within a limited physical distance, that is, within a predetermined distance, between devices. The other interfaces may need an additional operation to generate a connection, for example, a pairing connection. However, the PRC interface may generate a connection without a separate operation when a distance between devices is within 50 cm, and a device capable of a communication exists.

The ULP-BAN interface may be an ultra low power communication solution, which is available in a proximate distance, for example, in a distance less than or equal to 4 meters (m), between devices. A power consumption of a conventional resonance frequency (RF) interface may be about tens of nanojoules per bit (nJ/bit). In an example of a sensor of which a form factor is extremely limited, or a sensor to be attached to a human body, an operating life time greater than a capacity of a battery may be needed. Accordingly, the conventional RF solution may be difficult to use.

Considering the above, the ULP-BAN interface may be used to considerably reduce a distance between devices and a power consumption. A power consumption of the ULP-BAN interface may be about a few nJ/bit, which is about a few tenths of the power consumption of the conventional RF solution. Instead, a communication range of the ULP-BAN interface may be limited to a distance of less than or equal to 4 m between devices. However, such a communication range may be sufficient for an operational range of a healthcare sensor or other sensors to be attached to a human body.

In addition, depending on a needed communication range and a data rate, the PAN interface, including Bluetooth and/or Zigbee standards, the LAN interface satisfying the Institute of Electrical and Electronics Engineers (IEEE) 802.11 standards, and/or other air interfaces known to one of ordinary skill in the art, may be used as communication solutions. Herein, a method of selecting an air interface may be performed by a hub or a personal hub.

FIG. 1 is a diagram illustrating an example of a personal hub system using various air interfaces. The terms "personal hub" and "hub" are used in the same sense.

Various air interfaces may be used based on a distance between a hub (e.g., a smartphone as shown) and a device (e.g., any of devices to the right of the smartphone as shown), a data rate between the hub and the device, and a power consumption. For example, the air interfaces may include an LAN interface, including a wireless fidelity (Wi-Fi) standard, an PAN interface, including Bluetooth and/or Zigbee standards, a body area network (BAN) interface (e.g., a ULP-BAN interface) of the IEEE 802.15.6 standard, a near field communication (NFC) interface, and/or other interfaces known to one of ordinary skill in the art. Since the air interfaces may vary in functional specifications, a proper air interface may need to be used based on application requirements.

For example, if a communication is to be performed between a healthcare sensor and a personal hub, a distance between the devices within about a few meters of one another, and a data rate of about hundreds of kbps, may suffice. In this example, a power consumption of an air interface may be considered. A capacity of a battery may be limited based on a form factor of the healthcare sensor. Accordingly, the BAN interface may be used in consideration of a power consumption, which is lesser than power consumptions of the LAN and PAN interface.

The form factor may refer to a size of hardware, which may be limited based on a size of a device, a hub, an ambient device, and/or other devices. For example, a size of a battery may correspond to the form factor.

As described above, an optimal air interface may be selected while a personal hub providing air interfaces is connected to an ambient device, which may use a single air interface or a plurality of air interfaces. Accordingly, resources of the hub may be managed efficiently. The resources may include a power consumption, a channel frequency range, and/or other resources known to one of ordinary skill in the art.

Figure 2:
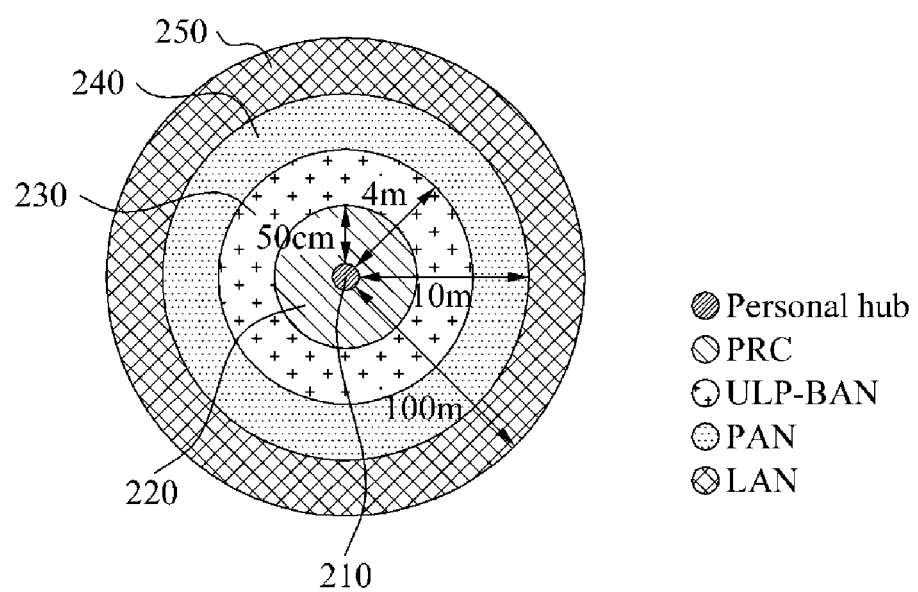
FIG. 2 is a diagram illustrating an example of a communication range of each air interface.

FIG. 2 is a diagram illustrating an example of a communication range of each air interface. Referring to FIG. 2, a PRC interface 220 may be used within an about 50-centimeter radius of a personal hub 210. A ULP-BAN interface 230 may be used within an about 4-meter radius of the personal hub 210. A PAN interface 240 may be used within an about 10-meter radius of the personal hub 210. A LAN interface 250 may be used within an about 100-meter radius of the personal hub 210.

Figure 3A:
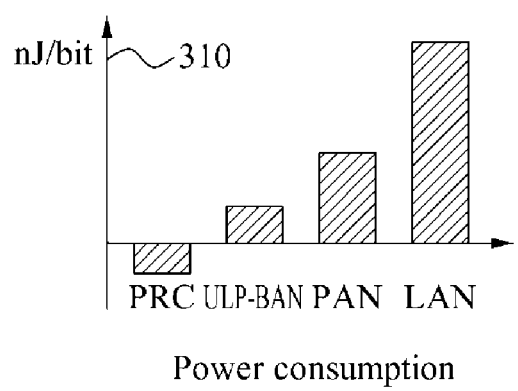
FIGS. 3A and 3B are graphs illustrating an example of a performance comparison of each air interface.
Figure 3B:
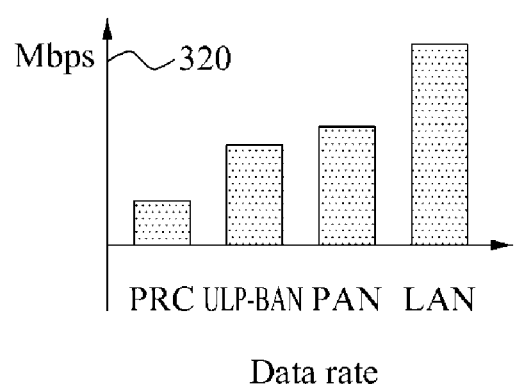

FIGS. 3A and 3B are graphs illustrating an example of a performance comparison of each air interface. In more detail, FIG. 3A is a graph illustrating an example of a power consumption 310 of each air interface, and FIG. 3B is a graph illustrating an example of a data rate 320 of each air interface.

Referring to the graph of FIG. 3A, the power consumption 310 of each air interface is indicated by a unit of nJ/bit. For example, since a power consumption of a PRC interface is a negative value, an ambient device connected to a hub via the PRC interface may be recharged wirelessly by the hub. A power consumption of a ULP-BAN interface is relatively low when compared to other interfaces. A power consumption of a PAN interface is moderate, and a power consumption of a LAN interface is relatively high, when compared to the other interfaces.

Referring to the graph of FIG. 3B, the data rate 320 of each air interface is indicated by a unit of mega bit per second (Mbps). For example, a data rate of the PRC interface is relatively low, data rates of the ULP-BAN interface and the PAN interface are moderate, and a data rate of the LAN interface is relatively high, when compared to each other. The data rate may refer to a data transmission rate.

Figure 4:
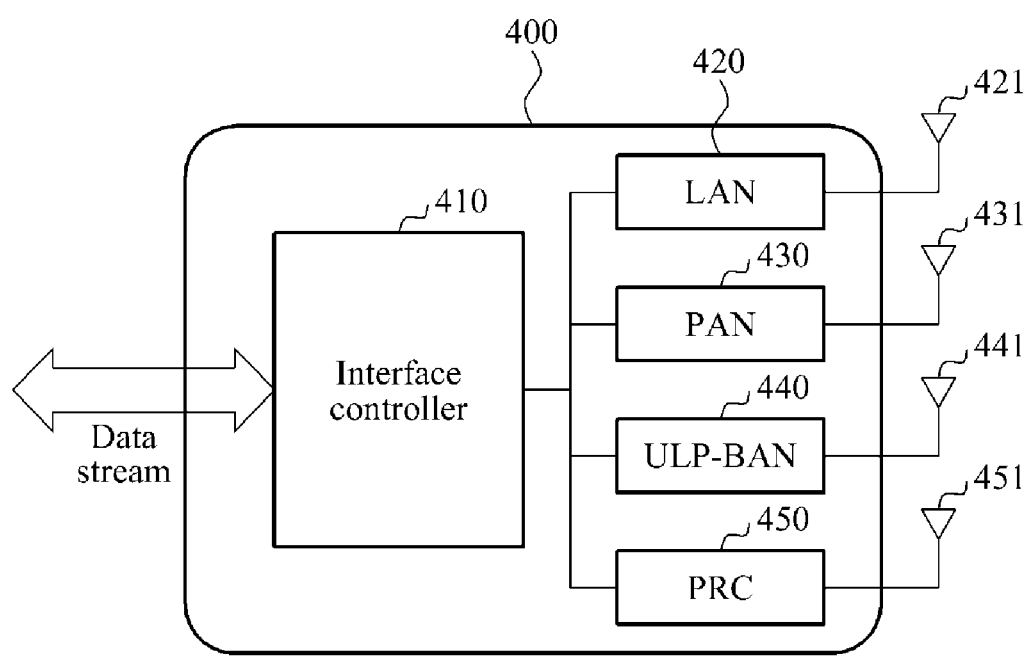
FIG. 4 is a diagram illustrating an example of a personal hub.

FIG. 4 is a diagram illustrating an example of a personal hub 400. Referring to FIG. 4, the personal hub 400 includes an interface controller 410 configured to receive a data stream, a LAN interface 420, an antenna 421 configured to be used for the LAN interface 420, a PAN interface 430, an antenna 431 configured to be used for the PAN interface 430, a ULP-BAN interface 440, an antenna 441 configured to be used for the ULP-BAN interface 440, a PRC interface 450, and an antenna 451 configured to be used for the PRC interface 450. However, the personal hub 400 is not limited thereto. Types of interfaces that are supported may be decreased or increased based on a form factor.

The personal hub 400 downloads a packet from an upper application via the data stream. The personal hub 400 further selects, and routes the packet to, a proper air interface, among the LAN interface 420, the PAN interface 430, the ULP-BAN interface 440, and the PRC interface 450. The LAN interface 420, the PAN interface 430, the ULP-BAN interface 440, and the PRC interface 450 transmit and receive data (e.g., the packet) through the antennas 421, 431, 441, or 451, respectively.

The interface controller 410 selects the proper or optimal air interface, among the LAN interface 420, the PAN interface 430, the ULP-BAN interface 440, and the PRC interface 450. The interface controller 410 may further search for an ambient device of the personal hub 400, set or select an air interface (e.g., the optimal air interface) to communicate with the ambient device, and transmit data (e.g., the packet) to the ambient device through the air interface.

Herein, a hub or a personal hub may refer to a device including a communication unit including at least one air interface, among a PRC interface, a ULP-BAN interface, a PAN interface, and a LAN interface. For example, the device may include a smartphone, a tablet personal computer (PC), and/or other devices known to one of ordinary skill in the art.

Figure 5:
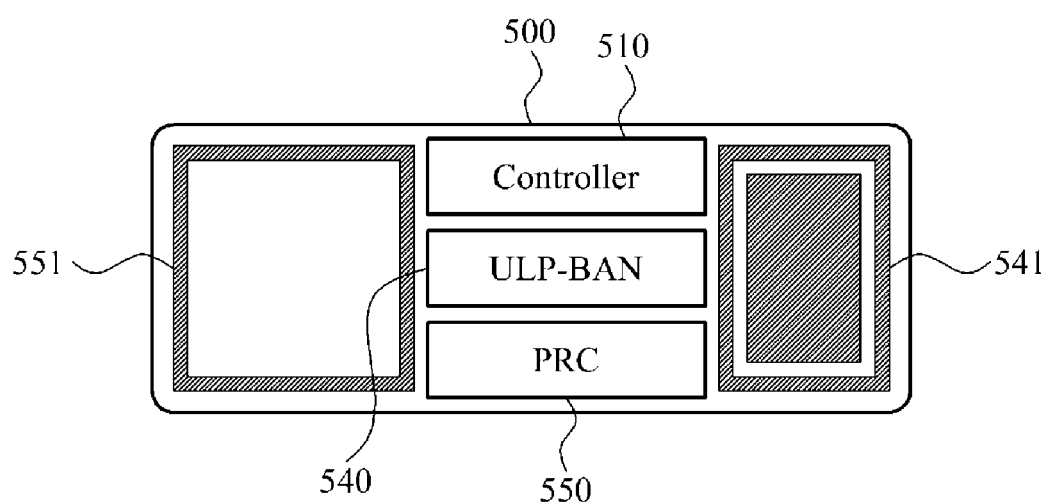
FIG. 5 is a diagram illustrating an example of a device including an ultra low power body area network (ULP-BAN) interface and a proximate resonance connectivity (PRC) interface.

FIG. 5 is a diagram illustrating an example of a device 500 including a ULP-BAN interface 540 and a PRC interface 550. The device 500 further includes a controller 510 including a processing unit and a storage medium, and a communication unit including the ULP-BAN interface 540, an antenna 541 configured to be used for the ULP-BAN interface 540, the PRC interface 550, and an antenna 551 configured to be used for the PRC interface 550.

The communication unit transmits and receives data through the ULP-BAN interface 540 and the antenna 541 configured to be used for the ULP-BAN interface 540, and the PRC interface 550 and the antenna 551 configured to be used for the PRC interface 550. The processing unit processes data based on an instruction of a program stored in the storage medium. The processing unit may include a microprocessor, for example, a central processing unit (CPU) and/or other microprocessors known to one of ordinary skill in the art.

The storage medium may include a computer-readable storage medium storing the program including instructions configured to cause the processing unit to perform operations. The computer-readable storage medium may include, for example, a hard disk, a solid state drive (SSD), a secure digital (SD) card, and/or other computer-readable storage media known to one of ordinary skill in the art. The instructions included in the program may be included in the controller 510.

When a hub provides a plurality of air interfaces, the hub selects an optimal air interface, among the air interfaces, for each application. For example, when the device 500 is located within a PRC communication range of the hub, and a needed data rate between the hub and the device 500 is relatively low, performing a communication through the PRC interface 550, rather than the ULP-BAN interface 540, may decrease power consumption. Accordingly, the hub and/or the device 500 select the PRC interface 550, rather than the ULP-BAN interface 540, to perform the communication with each other. However, when the needed data rate is relatively high, or when a distance between the hub and the device 500 is relatively long, the hub and/or the device 500 select the ULP-BAN interface 540, rather than the PRC interface 550, to perform the communication with each other. Accordingly, an air interface may be selected based on a communication environment or application requirements.

Figure 6:
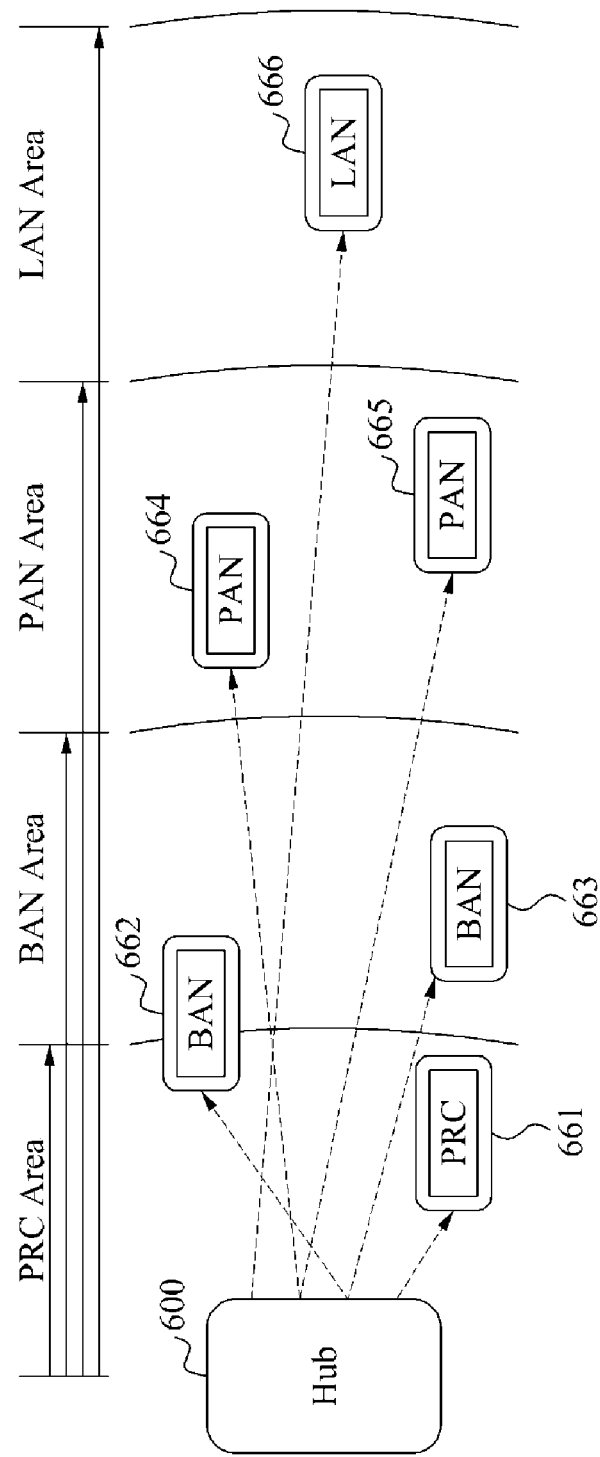
FIG. 6 is a diagram illustrating an example of a broadcast scheme using multiple air interfaces.

FIG. 6 is a diagram illustrating an example of a broadcast scheme using multiple air interfaces. Referring to FIG. 6, a hub 600 includes four types of air interfaces, for example, a PRC interface, a ULP-BAN interface, a PAN interface, and a LAN interface. In addition, one or more devices, for example, devices 661 through 666, may exist in each of a PRC area, a BAN area, a PAN area, and a LAN area. In more detail, the device 661 exists in the PRC area and includes a PRC interface, each of the devices 662 and 663 exists in the BAN area and includes a BAN interface, each of the devices 664 and 665 exists in the PAN area and includes a PAN interface, and the device 666 exists in the LAN area and includes a LAN interface. When identical or different information is to be transmitted to all devices on a channel, the hub 600 transmits data simultaneously to all of the devices 661 through 666 via the four air interfaces since channel frequencies of the respective air interfaces may be orthogonal to each other.

Figure 7:
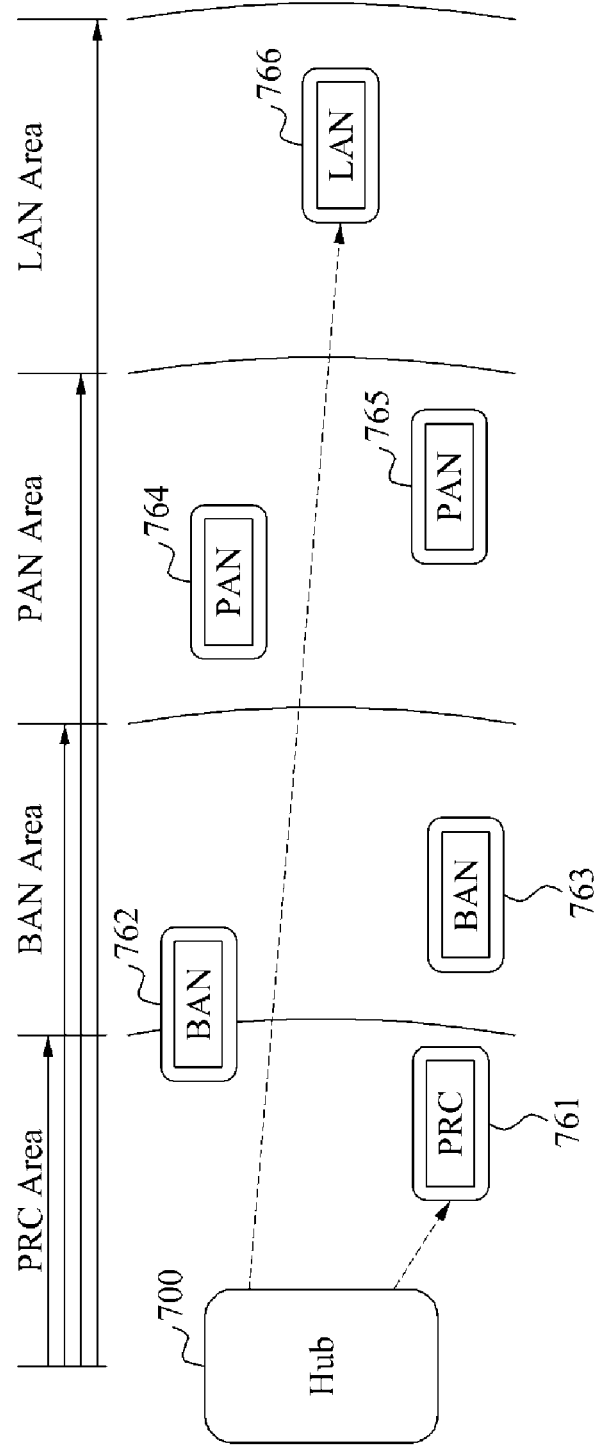
FIG. 7 is a diagram illustrating an example of a multicast scheme using multiple air interfaces.

FIG. 7 is a diagram illustrating an example of a multicast scheme using multiple air interfaces. Referring to FIG. 7, a hub 700 includes four types of air interfaces, for example, a PRC interface, a ULP-BAN interface, a PAN interface, and a LAN interface. In addition, one or more devices, for example, devices 761 through 766, may exist in each of a PRC area, a BAN area, a PAN area, and a LAN area. In more detail, the device 761 exists in the PRC area and includes a PRC interface, each of the devices 762 and 763 exists in the BAN area and includes a BAN interface, each of the devices 764 and 765 exists in the PAN area and includes a PAN interface, and the device 766 exists in the LAN area and includes a LAN interface.

When different information is to be transmitted through the LAN interface and the PRC interface, the hub 700 transmits different data simultaneously to the device 761 including the PRC interface, and the device 766 including the LAN interface. Instead of the different data, identical data may be transmitted to the different interfaces as well. The multicast scheme described above may be applied similarly to the devices 762 through 765 including the respective air interfaces.

Figure 8:
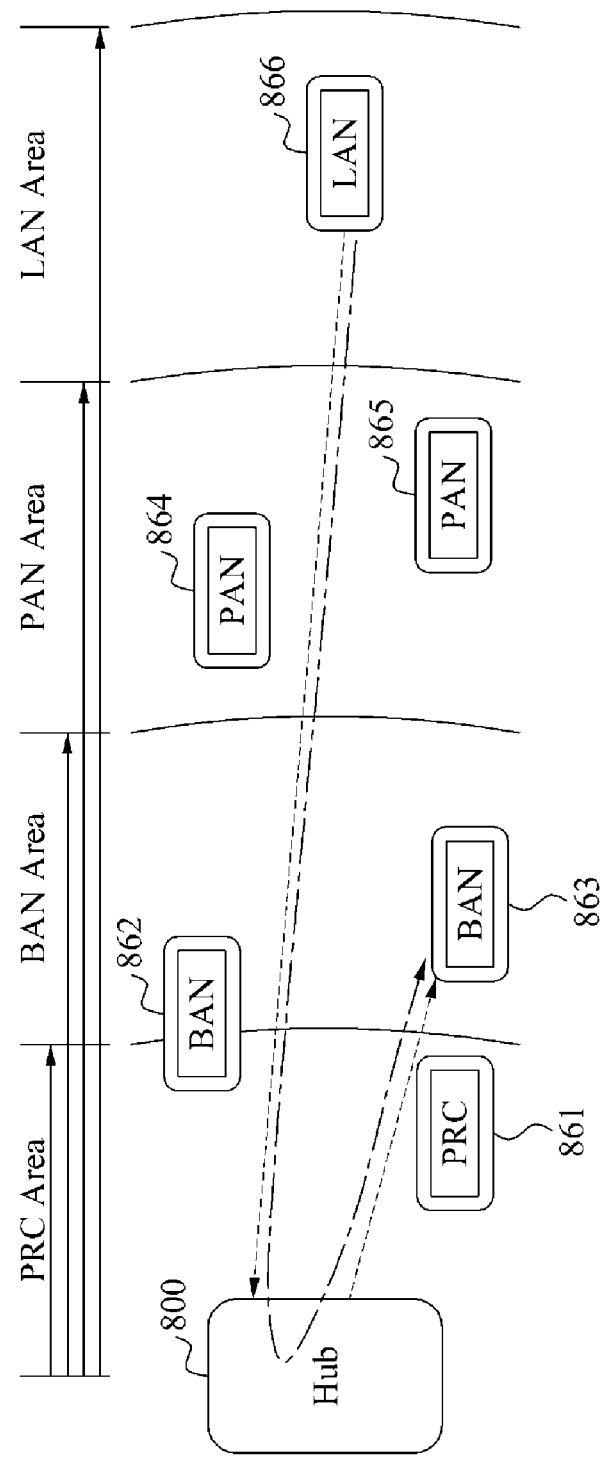
FIG. 8 is a diagram illustrating an example of a hub relaying scheme using multiple air interfaces.

FIG. 8 is a diagram illustrating an example of a hub relaying scheme using multiple air interfaces. Referring to FIG. 8, a hub 800 includes four types of air interfaces, for example, a PRC interface, a ULP-BAN interface, a PAN interface, and a LAN interface. In addition, one or more devices, for example, devices 861 through 866, may exist in each of a PRC area, a BAN area, a PAN area, and a LAN area. In more detail, the device 861 exists in the PRC area and includes a PRC interface, each of the devices 862 and 863 exists in the BAN area and includes a BAN interface, each of the devices 864 and 865 exists in the PAN area and includes a PAN interface, and the device 866 exists in the LAN area and includes a LAN interface.

When information is to be transmitted from the device 866 including the LAN interface to the device 863 including the BAN interface, the hub 800 performs a role of a gateway, a router, or a relay node, thereby transmitting the information between the heterogeneous air interfaces. The hub relaying scheme described above may be applied similarly to the devices 861, 862, 864, and 865 including the respective air interfaces.

Figure 9:
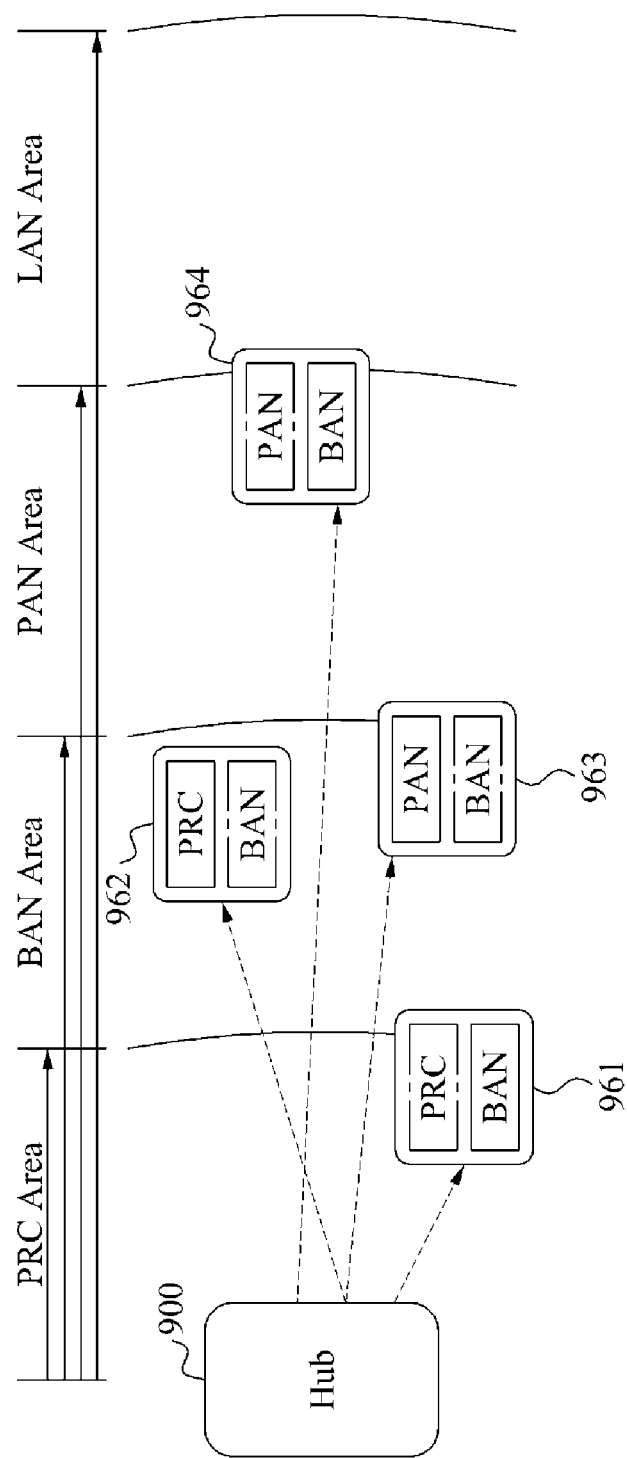
FIG. 9 is a diagram illustrating an example of a relationship between a hub and devices, each of which including multiple air interfaces.

FIG. 9 is a diagram illustrating an example of a relationship between a hub 900 and devices 961 through 964, each of which including multiple air interfaces. When a communication is performed between the hub 900 and the device 961, 962, 963, or 964 (e.g., a sensor) including the multiple air interfaces, an air interface may be selected from the multiple air interfaces based on a communication environment and/or application requirements.

Referring to FIG. 9, each of the device devices 961 and 962 includes a BAN interface and a PRC interface, and each of the devices 963 and 964 includes a PAN interface and a BAN interface. For example, when a relatively low power consumption is a constraint, the device 961 closest to the hub 900 exists within a PRC communication range or PRC area, and thus, the hub 900 and/or the device 961 select the PRC interface to minimize a power consumption. When the device 962 exists outside of the PRC communication range and within a BAN communication range or BAN area, the hub 900 and/or the device 962 select the BAN interface since a communication through the PRC interface may be impossible.

Similarly, each of the devices 963 and 964 selects an air interface from the multiple air interfaces. For example, the hub 900 and/or device 963 existing within the BAN communication range select the BAN interface to minimize a power consumption. The hub 900 and/or device 964 existing outside of the BAN communication range and within a PAN communication or PAN area select the PAN interface to minimize a power consumption.

Figure 10B:
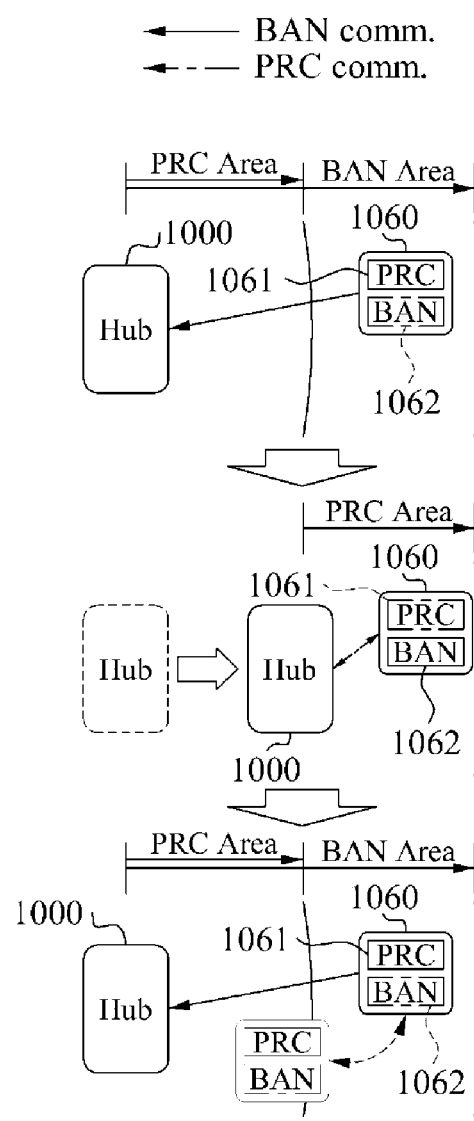
FIG. 10B is a diagram illustrating an example of a physical movement of a hub.

FIG. 10A is a flowchart illustrating an example of a method of wireless power recharging through a PRC interface. FIG. 10B is a diagram illustrating an example of a physical movement of a hub 1000. Referring to FIGS. 10A and 10B, the wireless power recharging is performed between the hub 100 and a device 1060 including a PRC interface 1061 and a BAN interface 1062.

Since information and energy may be transmitted through a PRC interface, the device 1060 including the PRC interface 1061 may be recharged wirelessly. When the device 1060 exists outside of a PRC communication range or PRC area and within another communication range or area (e.g., a BAN communication range or BAN area) in a usage circumstance, the device 1060 may transmit and receive information through another air interface (e.g., the BAN interface 1062). However, when a battery of the device 1060 is discharged and needs to be recharged, the device 1060 may attempt wireless power recharging through the PRC interface 1061 by performing a communication with the hub 1000. The detailed description of the foregoing method will be provided as follows.

In operation 1001, the device 1060 including the BAN interface 1062 determines a point in time at which wireless power recharging of the battery is needed, and transmits a recharge request to the hub 1000 through the BAN interface 1062 or BAN communication and a BAN interface of the hub 1000, as shown in a top portion of FIG. 10B.

In operation 1002, the hub 1000 receiving the recharge request determines whether the device 1060 exists within the PRC communication range, through a PRC interface or PRC communication of the hub 1000. In more detail, the hub 1000 requests an identity (ID) of the device 1060 transmitting the recharge request through the PRC interface of the hub 1000, and may receive a response to the request from the device 1060 through the PRC interface of the hub 1000.

In operation 1003, the hub 1000 reports, to a user, that the device 1060 is out of the PRC communication range when a response is not received from the device 1060 through the PRC interface of the hub 1000. The user physically moves the hub 1000 to a location within the PRC communication range, as shown in a middle portion of FIG. 10B.

In operations 1004 through 1006, the hub 1000 moved to the location within the PRC communication range verifies the ID of the device 1060, and performs power transmission to the device 1060, through the PRC interface of the hub 100, as further shown in the middle portion of FIG. 10B. In more detail, in operation 1004, the hub 1000 requests the ID of the device 1060 through the PRC interface of the hub 1000. In operation 1005, the hub 1000 verifies the ID of the device 1060 by receiving a response to the request from the device 1060 through the PRC interface 1061 and the PRC interface of the hub 1000. In operation 1006, the hub 1000 transmits power to the device 1060 through the PRC interface of the hub 1000 and the PRC interface 1061.

In operation 1007, after a sufficient amount of the power is received, the device 1060 transmits a stop charging request to suspend the power transmission to the hub 1000 through the PRC interface 1061 and the PRC interface of the hub 1000.

In operation 1008, after the power transmission is suspended, the hub 1000 switches the PRC interface to the BAN interface (e.g., a ULP-BAN interface), of the hub 1000, thereby being able to perform a communication within the BAN communication range.

In operation 1009, the hub 1000 performs a normal operation of communicating with the device 1060 through the BAN interface of the hub 1000 and the BAN interface 1062, as shown in a bottom portion of FIG. 10B. As further shown in the bottom portion of FIG. 10B, the device 1060 is physically moved to a location within the BAN communication range.

Figure 11:
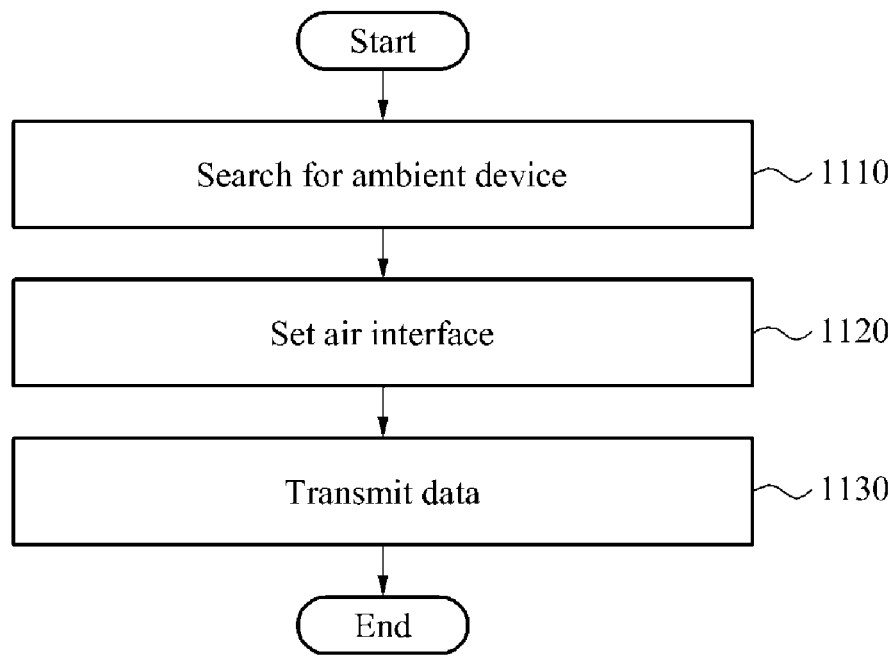
FIG. 11 is a flowchart illustrating an example of a method of selecting an air interface.

FIG. 11 is a flowchart illustrating an example of a method of selecting an air interface. In operation 1110, a hub searches for an ambient device (e.g., a peripheral device) of the hub. The ambient device may include a healthcare sensor configured to monitor a health condition of an individual, and may include at least one air interface, among a PRC interface, a ULP-BAN interface, a PAN interface, and a LAN interface. For example, the hub may search sequentially or simultaneously for an ambient device including each of the PRC interface, the ULP-BAN interface, the PAN interface, and the LAN interface.

In operation 1120, the hub sets an air interface of the hub. For example, the hub may set an optimal air interface to communicate with the ambient device. Operation 1120 will be described in detail with reference to FIGS. 13 and 14.

In operation 1130, the hub transmits data to the ambient device through the set air interface. For example, the hub may transmit data to the ambient device through the optimal air interface set in operation 1120. The data may be transmitted using a predetermined routing scheme or a routing scheme determined by the hub. The routing scheme may include a broadcast scheme, a multicast scheme, a relaying scheme, and other data transfer routes known to one of ordinary skill in the art.

Figure 12:
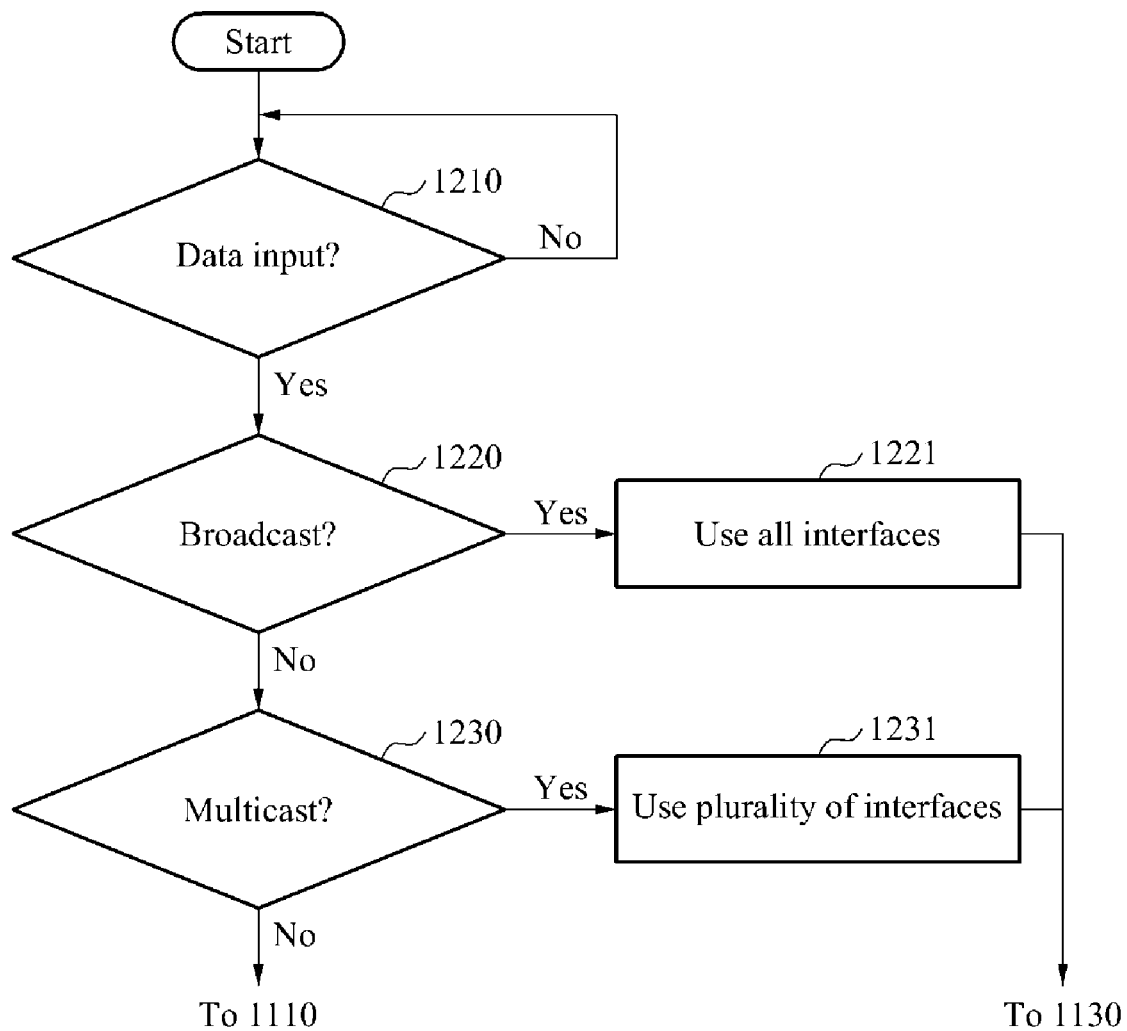
FIG. 12 is a flowchart illustrating an example of a method of determining a routing scheme of data to be transmitted.

FIG. 12 is a flowchart illustrating an example of a method of determining a routing scheme of data to be transmitted. For example, the routing scheme may include a broadcast scheme, a multicast scheme, a relaying scheme, and other data transfer routes known to one of ordinary skill in the art.

In operation 1210, a hub determines whether data to be transmitted is input in the hub. If the data is determined to be input, the method continues in operation 1220. Otherwise, the method returns to operation 1210. That is, until the data is input, the hub is in a stand-by state without a separate operation being performed.

In operation 1220, the hub determines whether the input data is to be transmitted based on the broadcast scheme. When the input data is determined to be transmitted based on the broadcast scheme, the method continues in operation 1221. Otherwise, the method continues in operation 1230. In operation 1221, the hub uses all of air interfaces of the hub to transmit the input data. Accordingly, in operation 1130 of FIG. 11, the hub may transmit the input data to all ambient devices existing within respective communication ranges of the air interfaces of the hub.

In operation 1230, the hub determines whether the input data is to be transmitted based on the multicast scheme. When the input data is determined to be transmitted based on the multicast scheme, the method continues in operation 1231. Otherwise, the method continues in operation 1110 of FIG. 11. In operation 1231, the hub uses a plurality of air interfaces of the hub that correspond to air interfaces of ambient devices to which the input data is to be transmitted, to transmit the input data. Accordingly, in operation 1130 of FIG. 11, the hub may transmit the input data to the ambient devices to which the input data is to be transmitted and that exist within the respective communication ranges of the air interfaces of the hub.

In an example, if a predetermined routing scheme is absent with respect to the input data, operations 1110 through 1130 of FIG. 11 may be performed to transmit the input data to a single ambient device through an air interface optimized for the single ambient device. In another example, the hub may determine a routing scheme with respect to the input data based on information included in the input data, and/or based on information predetermined in the hub by the user. In this example, if the input data includes information indicating that the input data is to be broadcast, the hub may determine that the input data is to be transmitted based on the broadcast scheme. If the information predetermined in the hub by the user indicates that the input data is to be multicast, the hub may determine that the input data is to be transmitted based on the multicast scheme.

In still another example, if the hub receives data from an ambient device, using a relaying scheme among routing schemes, the hub may relay the data to another ambient device. The hub may relay the data, using an identical air interface as used by the ambient devices within a range in which interference may not occur between the ambient device transmitting the data and the other ambient device to which the data is to be relayed. The hub may also relay the data, using different air interfaces as used by the ambient devices in order to prevent interference fundamentally.

Figure 13:
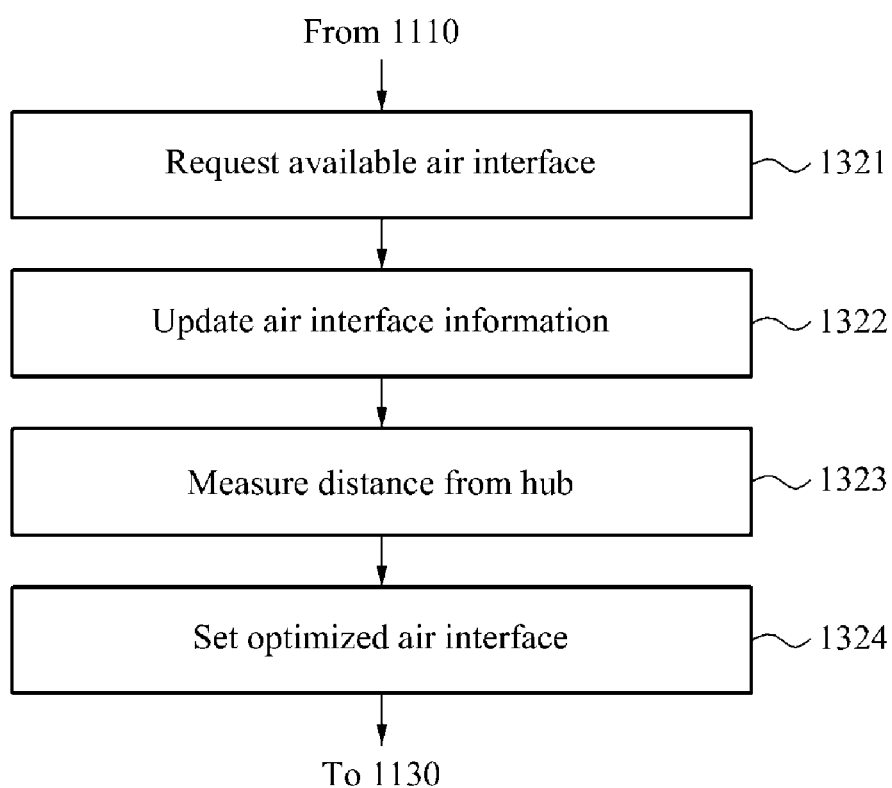
FIG. 13 is a flowchart illustrating an example of a method of setting an optimal air interface.

FIG. 13 is a flowchart illustrating an example of a method of setting an optimal air interface. Referring to FIG. 13, operations 1321 through 1324 may be performed in response to an ambient device using an air interface supported by a hub being found in operation 1110 of FIG. 11.

In operation 1321, the hub requests, from the found ambient device, information of at least one air interface available to the found ambient device. For example, the ambient device may include a PRC interface, a ULP-BAN interface, a PAN interface, and/or a LAN interface.

In operation 1322, the hub receives and updates the information of the air interface available to the found ambient device. For example, the information of the air interface available to the found ambient device may include a communication environment and application requirements. The application requirements may include a power consumption, a data rate, a communication range, a connectivity, and/or other information known to one of ordinary skill in the art. The communication environment may include a radio intensity, noise, and/or other environmental information known to one of ordinary skill in the art.

In operation 1323, the hub measures a distance from the hub to the found ambient device. For example, the distance may be measured based on the radio intensity and the noise.

In operation 1324, the hub sets an optimized air interface of the hub, or selects the optimized air interface of the hub from air interfaces of the hub that correspond to the at least one air interface available to the found ambient device, based on the distance. However, a criterion for setting the optimized air interface is not limited to the distance, and the optimized air interface may be set based on the communication environment and the application requirements, excluding the distance. After operation 1324, the method continues in operation 1130 of FIG. 11.

FIG. 14 is a flowchart illustrating another example of a method of setting an optimal air interface. Referring to FIG. 14, operations 1410 through 1440 may be performed in response to a distance from a hub to a found ambient device being measured in operation 1323 of FIG. 13.

In operation 1410, the hub determines whether the measured distance is less than or equal to 50 cm, and a PRC interface is available to each of the hub and the ambient device. If the measured distance is determined to be less than or equal to 50 cm, and the PRC interface is determined to be available to each of the hub and the ambient device, the method continues in operation 1411. Otherwise, the method continues in operation 1420.

In operation 1411, the hub uses the PRC interface as the optimal air interface used to transmit data to the ambient device.

In operation 1420, the hub determines whether the measured distance is less than or equal to 4 m, and a BAN or ULP-BAN interface is available to each of the hub and the ambient device. If the measured distance is determined to be less than or equal to 4 m, and the BAN interface is determined to be available to each of the hub and the ambient device, the method continues in operation 1421. Otherwise, the method continues in operation 1430.

In operation 1421, the hub uses the BAN interface as the optimal air interface used to transmit data to the ambient device.

In operation 1430, the hub determines whether the measured distance is less than or equal to 10 m, and a PAN interface is available to each of the hub and the ambient device. If the measured distance is determined to be less than or equal to 10 m, and the PAN interface is determined to be available to each of the hub and the ambient device, the method continues in operation 1431. Otherwise, the method continues in operation 1440.

In operation 1431, the hub uses the PAN interface as the optimal air interface used to transmit data to the ambient device.

In operation 1440, the hub uses a LAN interface as the optimal air interface used to transmit data to the ambient device. This is because the PRC interface, the BAN interface, and the PAN interface, among the air interfaces to be used to connect the hub and the ambient device, are unavailable if any one of two conditions in each of operations 1410, 1420, and 1430 is not satisfied.

In operation 1130 of FIG. 11, the hub transmits the data to the ambient device through the optimal air interface used in one of operations 1411, 1421, 1431, and 1440.

The examples of a hub described may include air interfaces, and may manage resources efficiently. If a device includes multiple air interfaces, the hub may select an optimal air interface based on a communication environment and application requirements. If the device includes a PRC interface, the device may be recharged wirelessly. A battery of a BAN device, a PAN device, or a LAN device that includes a PRC interface secondarily may be recharged wirelessly through the PRC interface.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of selecting an interface by a hub, the method comprising:
    searching, by the hub, for a device close to the hub;
    retrieving, by the hub, information on an available interface of the device from the device;
    measuring, by the hub, a distance from the hub to the device;
    selecting, by the hub, an interface of the hub from among a plurality of interfaces supported by the hub to communicate with the device, based on the measured distance and the information on the available interface of the device;
    transmitting, by the hub, data to the device through the selected interface of the hub; and
    in response to the selected interface being a proximate resonance connectivity (PRC) interface
        receiving a battery recharge request from the device;
        verifying, by the hub through the PRC interface, an identity of the device;
        transmitting a power to the device through the PRC interface in response the identity of the device being verified; and
        switching from the PRC interface to another interface of a different type in response to recharging of the device being completed.

2. The method of claim 1, further comprising:
    determining a routing scheme based on the data,
    wherein the transmitting comprises transmitting the data to the device through the selected interface of the hub based on the routing scheme.

3. The method of claim 2, wherein the routing scheme comprises a broadcast scheme, or a multicast scheme, or a relaying scheme, or any combination thereof.

4. The method of claim 1, wherein the selected interface of the hub comprises a local area network (LAN) interface, a personal area network (PAN) interface, a body area network (BAN) interface, a near field communication (NFC) interface, or a proximate resonance connectivity (PRC) interface, or any combination thereof.

5. The method of claim 1, further comprising:
    transmitting a power to the device through selected the interface of the hub in response to the selected interface of the hub being a proximate resonance connectivity (PRC) interface.

6. The method of claim 1, wherein the interface of the hub comprises a body area network (BAN) interface.

7. The method of claim 1, wherein the information of the interface of the device further comprises a power consumption of the interface of the device, a data rate of the interface of the device, a distance in which communication is performable by the interface of the device, a radio intensity, and noise.

8. The method of claim 1, wherein the verifying comprises: requesting, from the device, the identity of the device; and receiving, from the device, a response to the request.

9. The method of claim 1, wherein:
    the verifying comprises requesting, from the device, the identity of the device; and
    the method further comprises reporting, to a user, that the device is out of a PRC communication range in response to a response to the request not being received from the device.

10. The method of claim 1, wherein the selecting comprises:
    in response to the distance being less than a first predetermined value, and a proximate resonance connectivity (PRC) interface being available in each of the hub and the device, setting the interface of the hub to the PRC interface;
    in response to the distance being less than a second predetermined value, and a body area network (BAN) interface being available in each of the hub and the device, setting the interface of the hub to the BAN interface;
    in response to the distance being less than a third predetermined value, and a personal area network (PAN) interface being available in each of the hub and the device, setting the interface of the hub to the PAN interface; and
    otherwise, setting the interface of the hub to a local area network (LAN) interface.

11. The method of claim 1, further comprising:
    retrieving application requirements from the device; and
    selecting the interface of the hub based on the received application requirements.

12. The method of claim 11, wherein the application requirements comprise a preferred power consumption of the device, a preferred data rate of the device, or a communication range of the device.

13. The method of claim 1, wherein each interface of the plurality of interfaces supported by the hub comprises a type, a power consumption, a data rate, and a communication range.

14. The method of claim 1, further comprising:
    retrieving, by the hub, information on a plurality of available interfaces of the device from the device; and
    selecting the interface of the hub based on the information on the plurality of available interfaces of the device.

15. A non-transitory computer-readable storage medium storing a program comprising instructions to cause a computer to perform the method of claim 1.

16. A method of selecting an interface by a hub, the method comprising:
- searching, by the hub, for a device close to the hub;
- requesting, by the hub from the device, information of an interface of the device;
- receiving, by the hub from the device, the information;
- measuring, by the hub, a distance from the hub to the device based on the information;
- selecting, by the hub, an interface of the hub from among a plurality of interfaces supported by the hub to communicate with the device, based on the measured distance and the information of the interface of the device;
- transmitting, by the hub, data to the device through the selected interface of the hub, and
- in response to the selected interface being a proximate resonance connectivity (PRC) interface
  - receiving a battery recharge request from the device;
  - verifying, by the hub through the PRC interface, and identity of the device;
  - transmitting a power to the device through the PRC interface in response the identity of the device being verified; and
  - switching from the PRC interface to another interface of a different type in response to recharging of the device being completed.

17. The method of claim 16, wherein the information of the interface of the device comprises a power consumption of the interface of the device, or a data rate of the interface of the device, or a distance in which communication is performable by the interface of the device, or a radio intensity, or noise, or any combination thereof.

18. A hub configured to select an interface, the hub comprising:
- a plurality of interfaces; and
- a controller configured to
  - search for a device close to the hub,
  - request, from the device, information of an interface of the device,
  - receive, from the device, the information,
  - measure a distance from the hub to the device based on the information,
  - select, from among the plurality of interfaces, the interface optimized to communicate with the device, based on the measured distance and the information of the interface of the device, and
  - transmit data to the device through the selected optimized interface,
  - wherein the controller is further configured to, in response to the optimized interface being a proximate resonance connectivity (PRC) interface
    - receive a battery recharge request from the device;
    - verify, by the hub through the PRC interface, an identity of the device;
    - transmit a power to the device through the PRC interface in response the identity of the device being verified; and
    - switch from the PRC interface to another interface of a different type in response to recharging of the device being completed.

19. The hub of claim 18, wherein the controller is configured to:
- determine a routing scheme based on the data; and
- transmit the data to the device through the optimized interface based on the routing scheme,
- wherein the routing scheme comprises a broadcast scheme, or a multicast scheme, or a relaying scheme, or any combination thereof.

20. The hub of claim 18, wherein the optimized interface comprises a local area network (LAN) interface, a personal area network (PAN) interface, a body area network (BAN) interface, a near field communication (NFC) interface, or a proximate resonance connectivity (PRC) interface, or any combination thereof.

21. The hub of claim 18, further comprising:
- a plurality of antennas, each antenna corresponding to a respective interface of the plurality of interfaces and configured to transmit the data from the respective interface to the device and to receive data from the device,
- wherein the plurality of antennas comprises a local area network (LAN) antenna, a personal area network (PAN) antenna, a body area network (BAN) antenna, a near field communication (NFC) antenna, or a proximate resonance connectivity (PRC) antenna, or any combination thereof.

22. The hub of claim 18, wherein the controller is further configured to:
- transmit a power to the device through the optimized interface in response to the optimized interface being a proximate resonance connectivity (PRC) interface.

23. The hub of claim 18, wherein the information of the interface of the device comprises a power consumption of the interface of the device, or a data rate of the interface of the device, or a distance in which communication is performable by the interface of the device, or a radio intensity, or noise, or any combination thereof.

* * * * *